United States Patent [19]

Blew

[11] Patent Number: 5,345,526
[45] Date of Patent: Sep. 6, 1994

[54] FIBER OPTIC CABLE HAVING BUFFER TUBES WITH OPTICAL FIBER BUNDLES THEREIN AND METHOD FOR MAKING SAME

[75] Inventor: Douglas J. Blew, Hickory, N.C.

[73] Assignee: Comm/Scope, Hickory, N.C.

[21] Appl. No.: 16,772

[22] Filed: Feb. 11, 1993

[51] Int. Cl.⁵ .............................................. G02B 6/44
[52] U.S. Cl. .................................. 385/112; 385/100; 385/111; 385/113
[58] Field of Search ............... 385/100, 102, 103, 104, 385/106, 109, 111, 112, 113

[56] References Cited

U.S. PATENT DOCUMENTS

| | | | |
|---|---|---|---|
| 4,072,398 | 2/1978 | Larsen et al. | 385/100 X |
| 4,128,736 | 12/1978 | Nutt et al. | 174/112 |
| 4,143,942 | 3/1979 | Anderson | 385/113 X |
| 4,148,560 | 4/1979 | Margolis | 385/113 X |
| 4,158,746 | 6/1979 | Taylor et al. | 385/112 |
| 4,272,155 | 6/1981 | Slaughter | 385/103 X |
| 4,690,499 | 9/1987 | Taylor et al. | 385/109 X |
| 4,711,523 | 12/1987 | Iri et al. | 385/109 X |
| 4,786,137 | 11/1988 | Cornelison et al. | 385/113 X |
| 4,818,060 | 4/1989 | Arroyo | 385/109 X |
| 4,844,575 | 7/1989 | Kinard et al. | 385/109 X |
| 4,895,427 | 1/1990 | Kraft | 385/113 X |
| 4,902,096 | 2/1990 | Calzolari et al. | 385/109 X |
| 4,909,592 | 3/1990 | Arroyo et al. | 385/113 X |
| 4,909,593 | 3/1990 | Harbort et al. | 385/109 X |
| 5,067,791 | 11/1991 | Nishiyama | 385/104 X |
| 5,125,063 | 6/1992 | Panuska et al. | 385/113 |
| 5,165,003 | 11/1992 | Carter | 385/113 X |
| 5,229,851 | 7/1993 | Rahman | 385/113 X |
| 5,249,248 | 9/1993 | Arroyo et al. | 385/113 |
| 5,283,014 | 2/1994 | Oestreich et al. | 385/113 X |

*Primary Examiner*—Brian Healy
*Attorney, Agent, or Firm*—Bell, Seltzer, Park & Gibson

[57] ABSTRACT

A fiber optic cable and method for making the cable includes a plurality of buffer tubes positioned around a central member with three levels of color coding to enhance identification of individual optical fibers within the cable. Each of the buffer tubes has a predetermined color for identifying each individual buffer tube from the other buffer tubes, and a plurality of optical fibers are positioned within each buffer tube and arranged in a plurality of optical fiber bundles within each buffer tube. Each optical fiber bundle includes a binder yarn surrounding respective ones of the optical fibers with each of the binders having a predetermined color for identifying each individual optical fiber bundle from the other optical fiber bundles within a respective buffer tube. In addition, each of the optical fibers has a predetermined color for identifying each individual optical fiber from other optical fibers within a respective optical fiber bundle. Accordingly, three levels of identification are provided in a compact cable having a relatively small cross-section and a large number of small groups of fibers may be formed as required for an emerging cable television architecture requiring a large number of spaced apart drop points for small groups of fibers.

35 Claims, 2 Drawing Sheets

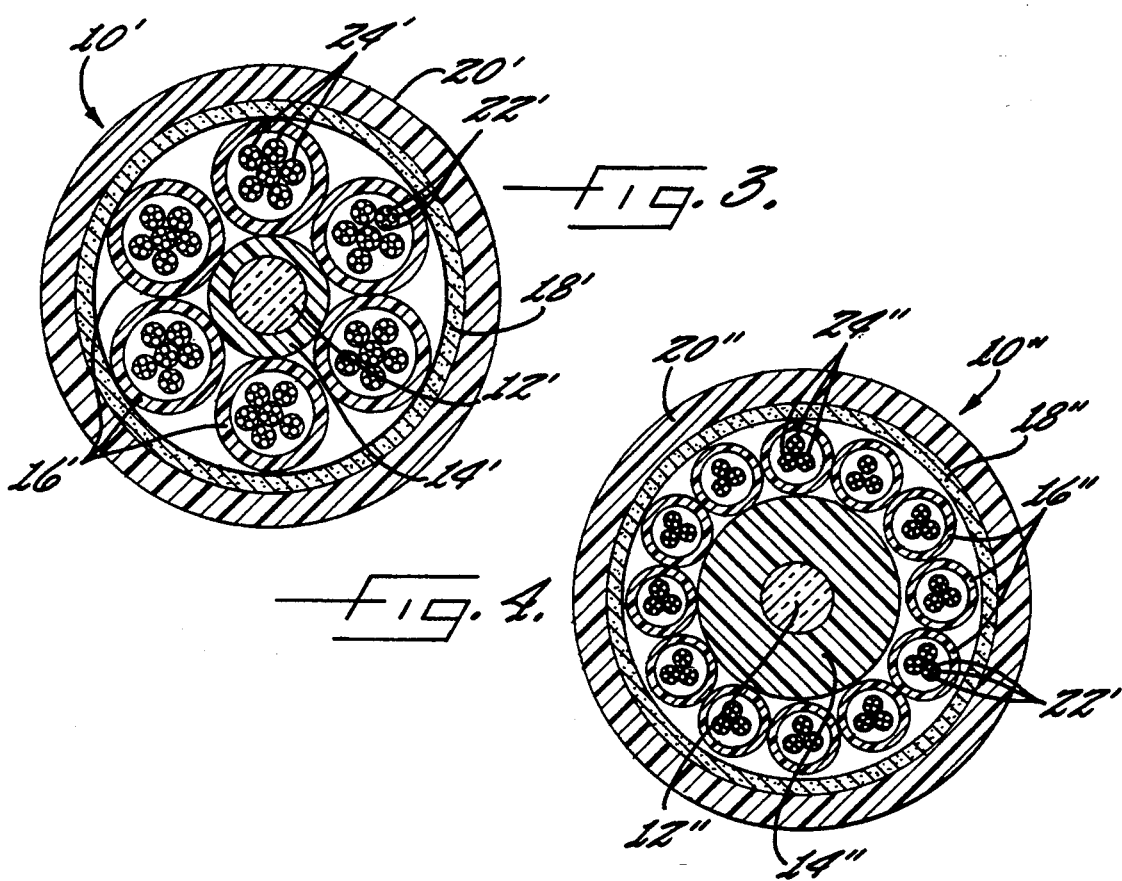

FIBER OPTIC CABLE HAVING BUFFER TUBES WITH OPTICAL FIBER BUNDLES THEREIN AND METHOD FOR MAKING SAME

FIELD OF THE INVENTION

The invention relates to the field of communication cables and more particularly to a fiber optic cable and method for making same.

BACKGROUND OF THE INVENTION

Communication cables employing optical fibers are widely used in the telecommunications industry. In particular, multifiber cables are widely used for long distance telephone communications, interexchange telephone applications, and other telephony and data transmission applications. Fiber optic cables are also being incorporated into cable television networks in place of more traditional coaxial cables. Optical fibers may permit long distances between signal repeaters or eliminate the need for such repeaters altogether. In addition, optical fibers offer extremely wide bandwidths and low noise operation.

A fiber optic cable typically includes a core and an outer protective jacket. A plurality of optical fibers are contained within the core. For a typical cable, such as used for long distance communications, the fibers are maintained in a loose-buffered relationship within the core to thereby isolate the fibers from strain imparted to the cable as the cable is installed and thereafter. A typical loose-buffer cable, such as available from Siecor of Hickory, N.C. under the designation MINIBUNDLE TM, includes a series of plastic buffer tubes stranded around a central support member in a concentric layer. The buffer tubes are identifiable based upon a unique color imparted to the plastic material. The individual optical fibers also include a color-coded coating thereon to enable identification of a particular individual fiber from the other fibers within a buffer tube of the cable.

A loose-buffered cable offered by AT&T under the designation LIGHTPACK LXE® is an effort to achieve a higher fiber packing density than available with a typical stranded multiple buffer tube cable. The AT&T cable includes a relatively large single central buffer tube which contains the plurality of optical fibers. U.S. Pat. No. 4,844,575 to Kinard et al. discloses such a cable wherein two groupings of individual fibers are formed within the single central buffer tube by a color-coded wrapping yarn surrounding predetermined ones of the individual optical fibers. Thus, the single central buffer tube cable includes color-coded yarns and color-coded optical fibers thereby providing two levels of color coding to assist a technician in identifying a particular optical fiber within the cable. This two-level color coding scheme is similar to that used in the stranded multiple buffer tube cable described above.

Color coding is typically used to identify one optical fiber from a plurality of such optical fibers in a multifiber cable. Since the number of distinctive basic colors are limited to typically twelve, color-coded optical fibers are typically segregated into groupings that are themselves identified by the same basic twelve colors. For example, in a 96-fiber cable of the stranded multiple buffer tube type, eight color-coded buffer tubes may each contain twelve individually color-coded optical fibers. Similarly, for a 96-fiber optic cable having a single central buffer tube, presumably groups of twelve color-coded fibers may be arranged into eight bound groupings by eight respective individually color-coded yarns.

Unfortunately, an emerging cable television architecture requires a relatively small number of grouped fibers, typically three or four, to be identified, accessed and connected at a drop point. In addition, a large number of spaced apart drop points are typically required along the cable route and, hence, a large number of individual fibers are also required in the cable. Conventional stranded multiple buffer tube cables and single central buffer tube cables are unacceptable for such an architecture. For example, if groups of four fibers are desired in a 96-fiber cable, an exceedingly large number of buffer tubes, i.e., twenty-four, would be needed in the multiple buffer tube cable, greatly reducing the packing density of the cable and concurrently increasing the cost of the cable. Higher fiber count cables would require an even greater number of buffer tubes. For the central buffer tube cable, current designs are limited to only about eight groups; therefore, the maximum number of fibers in such a cable would be limited to only thirty-two.

Another important aspect of a fiber optic cable for the emerging cable television architecture, in addition to being able to readily identify an individual fiber, is the ability to access the relatively small grouping of optical fibers without damaging adjacent fibers. In other words, it is important that disturbance to adjacent fibers be minimized to prevent the possibility of damage to the fibers. In this respect, the multiple buffer tube cable offers an advantage over the central buffer tube cable. A single buffer tube may be accessed in the multiple buffer tube cable while the remainder of fibers within other buffer tubes are undisturbed. In contrast, entry into the single central buffer tube is likely to increase the risk of damaging adjacent fibers since all of the fibers are contained within the single buffer tube.

SUMMARY OF THE INVENTION

In view of the foregoing background, it is therefore an object of the invention to provide a fiber optic cable and method for making such a cable including a relatively large number of fibers arranged into relatively small groupings with individual optical fibers also being readily identifiable within the cable.

It is another object of the invention to provide a fiber optic cable and method for making the cable having a relatively large number of fibers arranged into relatively small groupings so that an individual grouping can be readily accessed while minimizing the disturbance to adjacent fibers within the cable.

These and other objects, advantages, and features of the present invention are provided by a fiber optic cable including a plurality of buffer tubes positioned around a central member with each of the buffer tubes having a predetermined color for identifying each individual buffer tube from the other buffer tubes within the cable and a plurality of optical fibers positioned within each buffer tube and arranged in a plurality of optical fiber bundles within each buffer tube. Moreover, each optical fiber bundle includes a binder surrounding respective ones of the optical fibers with each binder having a predetermined color for identifying each individual optical fiber bundle from the other optical fiber bundles within a respective buffer tube. Each of the optical fibers has a predetermined color for identifying each individual optical fiber from other optical fibers within a respective optical fiber bundle. Accordingly, three levels of color coding are provided to enhance identification of individual optical fibers within the cable. As would be readily understood by those skilled in the art, the color-coding aspect of the present invention represents a preferred and readily manufactured approach for associating an identifying indicia with the optical fibers, the binders for the optical fiber bundles, and the buffer tubes.

As would also be readily understood by those skilled in the art, the buffer tubes are preferably arranged in an oscillating helical lay pattern around the central member. The central member may be a plastic covered metal wire or a bare plastic covered rod of fiber reinforced plastic. In addition, each of the buffer tubes preferably has a different color, although the individual buffer tubes may also be readily identified by their circumferential position with respect to a single colored tube, since the tubes are arranged in a concentric layer surrounding the central support member.

Each binder is preferably a textile yarn having a predetermined color and arranged in a spaced helical lay pattern surrounding respective ones of the optical fibers. Each of the binders within a respective buffer tube preferably has a different color.

The color coding pattern of fibers may be repeated for each of the bundles within a respective buffer tube. And similarly, each of the color coding patterns for the binders can be repeated in the buffer tubes.

Each of the optical fiber bundles preferably contains a relatively small number of optical fibers to facilitate drop connections to the respective individual optical fiber bundles at a plurality of drop points along the length of the cable. A relatively small number of optical fiber bundles are placed in each buffer tube to reduce a likelihood of disturbing other optical fibers in other buffer tubes within the cable. In a preferred embodiment of the invention, each of the optical fiber bundles contains no more than about four optical fibers and each of the buffer tubes contains no more than about six optical fiber bundles.

The cable also preferably includes means extending lengthwise adjacent the plurality of buffer tubes, such as an aramid yarn, for imparting tensile strength to the cable. Each of the buffer tubes also preferably has a predetermined inner cross-sectional area slightly larger than the combined cross-sectional areas of the respective optical fiber bundles so that the respective optical fiber bundles are carried in a loose-buffered relationship within each of the buffer tubes. An outer protective jacket is also preferably provided for the cable.

The method according to the invention includes the steps of arranging a plurality of optical fibers into a plurality of optical fiber bundles within each buffer tube and securing a binder having an identifying indicia associated therewith around each of the optical fiber bundles for identifying each individual optical fiber bundle from the other bundles in a respective buffer tube. As described above, each optical fiber also preferably has a predetermined color for identifying each individual optical fiber from the other optical fibers within a respective optical fiber bundle.

BRIEF DESCRIPTION OF THE DRAWINGS

FIG. 3 is a cross-sectional view of another embodiment of a fiber optic cable according to the invention.

FIG. 4 is a cross-sectional view of yet another embodiment of a fiber optic cable according to the invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiment set forth herein; rather, these embodiment are provided so that this disclosure will be thorough and complete, and will fully convey the scope of the invention to those skilled in the art. Like numbers refer to like elements throughout. Prime notation is used to indicate similar elements in alternative embodiments of the invention.

Figure 1:
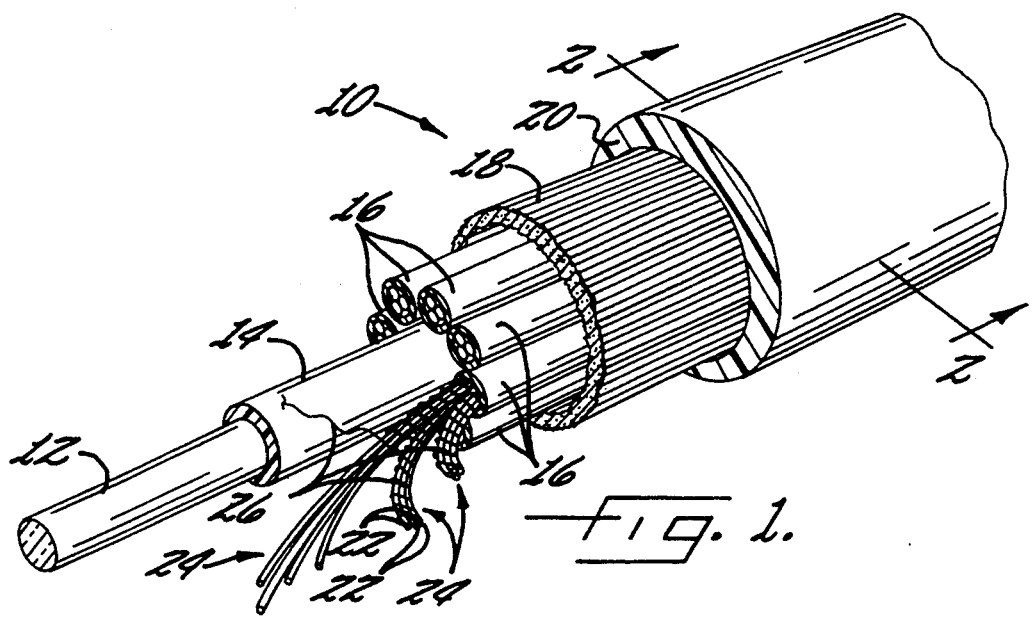
FIG. 1 is a perspective view of an end portion of a fiber optic cable according to the invention.
Figure 2:
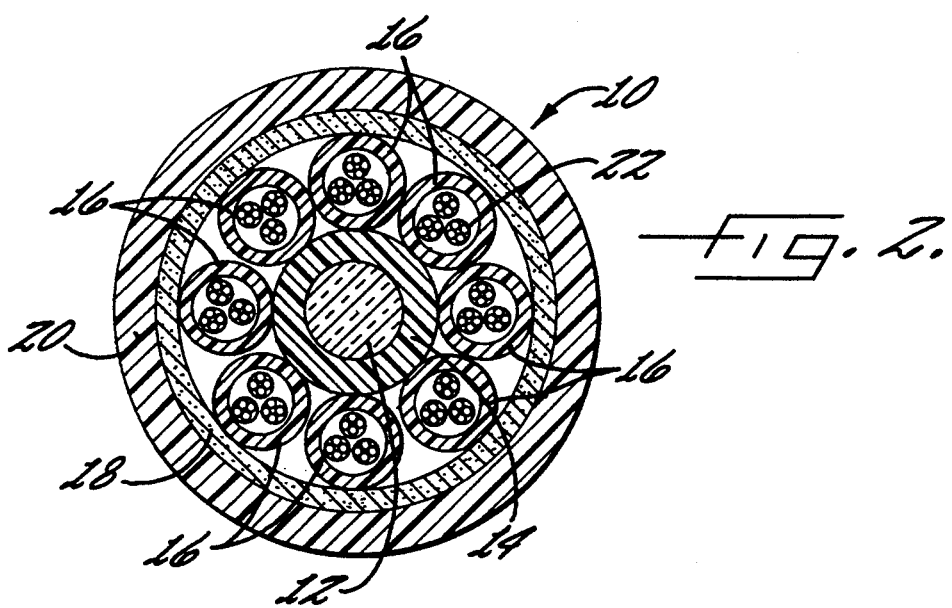
FIG. 2 is a cross-sectional view of the fiber optic cable of FIG. 1 taken along lines 2—2.

Referring now to FIGS. 1 and 2, a fiber optic cable 10 according to the present invention is illustrated. The cable 10 includes an elongated lengthwise extending central member formed of fiber reinforced plastic rod 12 with an optional plastic covering 14 thereon. As would be readily understood by those skilled in the art, other types of central members may be used including, for example, a metal wire with a plastic covering thereon, not illustrated.

A plurality of buffer tubes 16 are stranded about the central member. As would be readily understood by those skilled in the art, the buffer tubes 16 are preferably arranged in an oscillating helical lay pattern around the central member. As shown in the illustrated embodiment, a single concentric layer of such buffer tubes 16 are provided; however, as would be readily understood by those skilled in the art, two or more layers of buffer tubes may be provided for very high fiber count cables.

Each buffer tube 16 preferably has a different color selected from one of the twelve typical colors used in the telecommunications industry including blue, orange, green, brown, slate, white, red, black, yellow, violet, rose, and aqua. As would also be readily understood by those skilled in the art, other indicia may also be used to identify each buffer tube. For example, in a single layer of buffer tubes, one buffer tube could have a color different from the other buffer tubes. Accordingly, the circumferential position of a buffer tube with respect to the different colored buffer tube would identify the particular buffer tube.

As would be readily understood by those skilled in the cable art, the fiber optic cable 10 according to the invention also preferably includes lengthwise extending means for imparting tensile strength to the cable, such as a wrapping of aramid yarn 18, e.g., KEVLAR® available from dupont, surrounding the buffer tubes 16. As would be readily understood by those skilled in the art, a lengthwise extending strength member may be provided by other materials, such as a variety of yarns, steel strands, or fiber reinforced plastic, for example. The cable 10 also preferably includes a protective plastic outer jacket 20, such as a conventional polyethylene jacket, surrounding the aramid yarn 18.

The fiber optic cable 10 includes a plurality of optical fibers 22 positioned within each buffer tube 16 and arranged in a plurality of optical fiber bundles 24 within each buffer tube. Moreover, each optical fiber bundle 24 includes a binder 26 surrounding respective ones of the optical fibers with each binder 26 having a predetermined color for identifying each individual optical fiber bundle from the other optical fiber bundles within a respective buffer tube. In addition, each of the optical fibers 22 has a predetermined color for identifying each individual optical fiber from other optical fibers within a respective optical fiber bundle 24. Accordingly, three levels of color coding are provided to enhance identification of individual optical fibers 22 within the cable.

Each of the buffer tubes 16 also preferably has a predetermined inner cross-sectional area slightly larger than the combined cross-sectional areas of the respective optical fiber bundles 24 so that the respective optical fiber bundles are carried in a loose-buffered relationship within each of the buffer tubes. In addition, each binder 26 is preferably loosely surrounding the respective optical fibers 22 so as to permit a slight amount of relative movement between adjacent fibers within a bundle 24 as the bundle is bent during bending of the cable 10.

As would be readily understood by those skilled in the art, the color-coding of the present invention represents a preferred and readily manufactured approach for associating an identifying indicia with the optical fibers 22, the binders 26 for the optical fiber bundles 24, and the buffer tubes 16. Other indicia or markings may also be used, however, the color-coding scheme of the present invention is readily achieved and would also be readily appreciated by telecommunications technicians.

Each binder 24 is preferably a textile yarn having a predetermined color and arranged in a spaced helical lay pattern surrounding respective ones of the optical fibers. Each of the binders 24 within a respective buffer tube 16 preferably has a different color. The color coding pattern of fibers 22 may be repeated for each of the bundles 24 within a respective buffer tube 16. And similarly, each of the color coding patterns for the binders 26 may be repeated for all of the buffer tubes 16.

Each of the optical fiber bundles 24 preferably contains a relatively small number of optical fibers 22 to facilitate connections to the respective individual optical fiber bundles at a plurality of drop points along the length of the cable. In addition, the cable 10 of the present invention, by incorporating a plurality of buffer tubes 16, reduces the likelihood of disturbing other optical fibers within the cable as one of the buffer tubes is accessed at a drop point.

In a preferred embodiment of the invention, such as for the emerging cable television architecture having a large number of drop points for relatively small groupings of fibers, each of the optical fiber bundles 24 contains no more than about four optical fibers 22 and each of the buffer tubes 16 contains no more than about six optical fiber bundles 24. In addition, six to twelve buffer tubes 16 may be provided in a typical cable 10 according to the invention. Thus, from 144 up to 288 fibers may be provided in cable according to the invention having six or twelve buffer tubes, respectively, and each fiber in the cable may be readily distinguished and managed from the others.

FIG. 3 shows a cross-section of another embodiment of the cable 10' according to the invention. The illustrated embodiment includes six buffer tubes 16' with each buffer tube including six optical fiber bundles 24', of four fibers 22', each. The cable 10' also includes an outer protective plastic jacket 20' and a layer of aramid yarn 18' as the tensile strength member.

FIG. 4 shows a cross-section of yet another embodiment of a cable 10" according to the invention. This embodiment includes twelve buffer tubes 16" with each including three optical fiber bundles 24", of four fibers 22" each. Like the other embodiments of the cable, this embodiment also includes an outer protective plastic jacket 20' and a layer of aramid yarn 18" as the tensile strength member.

The method according to the invention includes the steps of arranging a plurality of optical fibers into a plurality of optical fiber bundles within each buffer tube and securing a binder having a predetermined color or other identifying indicia associated therewith around each of the optical fiber bundles for identifying each individual optical fiber bundle from the other bundles in a respective buffer tube. As described above, each optical fiber also preferably has a predetermined color for identifying each individual optical fiber from the other optical fibers within a respective optical fiber bundle.

The step of securing each binder around respective optical fibers preferably includes wrapping a textile yarn having a predetermined color around respective optical fibers in a spaced helical lay pattern. A relatively small number of optical fibers are preferably arranged in each bundle to thereby facilitate connections to respective individual optical fiber bundles at a plurality of drop points along the length of the cable.

As would be readily appreciated by those having skill in the art, the step of arranging the optical fibers into the optical fiber bundles within each buffer tube preferably includes arranging the optical fiber bundles in a loose-buffered relationship within each of the buffer tubes. An outer protective jacket is preferably extruded in surrounding relation to an underlying layer of aramid fibers and the plurality of buffer tubes.

The following TABLES 1 and 2 and associated description illustrate a hypothetical example of how the cable according to the present invention more fully exploits color repetitions than either the conventional multiple buffer tube cable or central buffer tube cable. In the example, a 96-fiber cable with groupings of four fibers is considered. First, for the cable of the present invention, three bundles of four fibers each are positioned in each of eight buffer tubes (FIGS. 1 and 2), such as to give the color repetition scheme set forth below in TABLE 1. This configuration may produce a cable having an overall diameter of only about 15 mm. In TABLE 1, each of the buffer tubes from Orange through Black includes the same color repetitions for both the individual fibers and the binders as in the fully illustrated Blue buffer tube.

TABLE 1

| | Color Repetitions for the Cable of the Invention | | |
|---|---|---|
| Fiber Color | Binder Color | Buffer Tube Color |
| Blue | Blue | Blue |
| Orange | | |
| Green | | |
| Brown | | |
| Blue | Orange | |
| Orange | | |
| Green | | |
| Brown | | |
| Blue | Green | |
| Orange | | |
| Green | | |
| Brown | | |
| | | Orange |
| | | Green |
| | | Brown |

TABLE 1-continued

| Color Repetitions for the Cable of the Invention | | |
|---|---|---|
| Fiber Color | Binder Color | Buffer Tube Color |
| | | Slate |
| | | White |
| | | Red |
| | | Black |

TABLE 2 below illustrates a hypothetical example of a 96-fiber cable of the conventional stranded multiple buffer tube type having an inner and outer layer of buffer tubes, with each buffer tube having four fibers. As shown in TABLE 2, there are three unknown color designations required beyond the basic twelve colors commonly used. In addition, the dual layer buffer tube cable would have a relatively large overall diameter of about 19.2 mm.

TABLE 2

| Color Repetitions for A Conventional Multiple Buffer Tube Cable | | |
|---|---|---|
| Fiber Color | Buffer Tube Color | In/Out Layer |
| Blue | Blue | Inner Layer |
| Orange | | |
| Green | | |
| Brown | | |
| | Orange | |
| | Green | |
| | Brown | |
| | Slate | |
| | White | |
| | Red | |
| | Black | |
| | Yellow | |
| | Blue | Outer Layer |
| | Orange | |
| | Green | |
| | Brown | |
| | Slate | |
| | White | |
| | Red | |
| | Black | |
| | Yellow | |
| | Violet | |
| | Rose | |
| | Aqua | |
| | Unknown | |
| | Unknown | |
| | Unknown | |

For a single layer stranded multiple buffer tube cable of a conventional type, the diameter of the central support member would be greatly enlarged to accommodate a single concentric layer of the twenty-four buffer tubes needed in the hypothetical 96-fiber cable having groupings of four fibers. Accordingly, the overall diameter for such a hypothetical cable would be an unacceptably larger 26.2 mm. In addition, twelve of the buffer tubes would require unknown colors distinguishable from the twelve commonly used basic colors.

For a hypothetical 96-fiber cable of the single central buffer tube type, twenty-four optical fiber groups would be required within the central buffer tube. Accordingly, twelve of the binders for the optical fiber groups would require unknown colors distinguishable from the twelve basic colors. Moreover, by having all twenty-four fiber groups within the central tube, access to any one of the groups would increase the risk of damaging adjacent fibers or groups of fibers within the single control buffer tube.

The fiber optic cable according to the present invention allows greater exploitation of color repetitions to enable a technician to quickly locate an individual optical fiber. In addition, the ability of the cable according to the invention to carry a large number of relative small bundles of optical fibers is particularly advantageous for the emerging cable television architecture having a large number of drop points for groups of three or four fibers. The arrangement of bundles of optical fibers within each buffer tube also permits access to a fiber bundle without increasing the likelihood of damaging fibers in other buffer tubes.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A fiber optic cable comprising:
    a lengthwise extending central member;
    a plurality of generally lengthwise extending buffer tubes positioned around said central member, each of said buffer tubes having a predetermined color for identifying each individual buffer tube from the other buffer tubes within said cable; and
    a plurality of individual optical fibers positioned within each of said buffer tubes and arranged in a plurality of optical fiber bundles within each buffer tube, each of said optical fiber bundles further comprising a binder surrounding respective ones of said plurality of individual optical fibers to organize and maintain the respective individual optical fibers together in bundled relation, each of said binders having a predetermined color for identifying each individual optical fiber bundle from the other optical fiber bundles within a respective buffer tube, each of said individual optical fibers having a predetermined color for identifying each individual optical fiber from other optical fibers within a respective optical fiber bundle;
    whereby three levels of color coding are provided to enhance identification of individual optical fibers from the other optical fibers within said cable.

2. A fiber optic cable according to claim 1 wherein said plurality of buffer tubes are arranged in an oscillating helical lay pattern around said central member.

3. A fiber optic cable according to claim 1 wherein each of said buffer tubes has a different color.

4. A fiber optic cable according to claim 1 wherein each of said binders within a respective buffer tube has a different color.

5. A fiber optic cable according to claim 1 wherein each of said binders comprises a textile yarn having a predetermined color and arranged in a spaced helical lay pattern surrounding respective ones of said plurality of optical fibers.

6. A fiber optic cable according to claim 4 wherein the predetermined colors for the respective binders in one of said buffer tubes are repeated for all of said buffer tubes.

7. A fiber optic cable according to claim 1 wherein the predetermined colors for the respective optical fibers in one of said optical fiber bundles are repeated for all of the optical fiber bundles in a respective buffer tube.

8. A fiber optic cable according to claim 1 wherein each of said optical fiber bundles contains a relatively small number of optical fibers to facilitate connections to respective individual optical fiber bundles at a plurality of drop locations along the length of the cable, and wherein each of said buffer tubes contains a relatively small number of optical fiber bundles to reduce a likelihood of disturbing other optical fibers within other buffer tubes of said cable.

9. A fiber optic cable according to claim 8 wherein each of said optical fiber bundles contains no more than about four optical fibers.

10. A fiber optic cable according to claim 8 wherein each of said buffer tubes contains no more than about six optical fiber bundles.

11. A fiber optic cable according to claim 1 further comprising means extending lengthwise adjacent said plurality of buffer tubes for imparting tensile strength to said cable.

12. A fiber optic cable according to claim 1 wherein each of said buffer tubes has a predetermined inner cross-sectional area slightly larger than the combined cross-sectional areas of the respective optical fiber bundles positioned therein so that the respective optical fiber bundles are carried in a loose-buffered relationship within each of said buffer tubes.

13. A fiber optic cable according to claim 1 further comprising an outer protective jacket surrounding said plurality of buffer tubes.

14. A fiber optic cable comprising:
a plurality of generally lengthwise extending buffer tubes positioned including indicia associated therewith for identifying each individual buffer tube from the other buffer tubes in said cable; and
a plurality of individual optical fibers positioned within each of said buffer tubes and arranged in a plurality of optical fiber bundles within each buffer tube, each of said optical fiber bundles further comprising a binder surrounding respective ones of said plurality of individual optical fibers to organize and maintain the respective individual optical fibers together in bundled relation, each of said binders having including indicia associated therewith for identifying each individual optical fiber bundle from the other optical fiber bundles within a respective buffer tube, each of said individual optical fibers having a predetermined color for identifying each individual optical fiber from the other optical fibers within a respective optical fiber bundle.

15. A fiber optic cable according to claim 14 wherein said indicia associated with each of said buffer tubes is a predetermined color thereof.

16. A fiber optic cable according to claim 15 wherein each of said buffer tubes has a different color.

17. A fiber optic cable according to claim 14 wherein said indicia associated with each of said binders is a predetermined color thereof.

18. A fiber optic cable according to claim 17 wherein each of said binders within a respective buffer tube has a different color.

19. A fiber optic cable according to claim 14 wherein each of said binders comprises a textile yarn having a predetermined color and arranged in a spaced helical lay pattern surrounding respective ones of said plurality of optical fibers.

20. A fiber optic cable according to claim 17 wherein the predetermined colors for the respective binders in one of said buffer tubes are repeated for all of the buffer tubes.

21. A fiber optic cable according to claim 14 wherein the predetermined colors for the respective optical fibers in one of said optical fiber bundles are repeated for all of the optical fiber bundles in a respective buffer tube.

22. A fiber optic cable according to claim 14 wherein each of said optical fiber bundles contains a relatively small number of optical fibers to facilitate connections to respective individual optical fiber bundles at a plurality of drop locations along the length of the cable, and wherein each of said buffer tubes contains a relatively small number of optical fiber bundles to reduce a likelihood of disturbing other optical fibers within other buffer tubes of said cable.

23. A fiber optic cable according to claim 22 wherein each of said optical fiber bundles contains no more than about four optical fibers.

24. A fiber optic cable according to claim 22 wherein each of said buffer tubes contains no more than about six optical fiber bundles.

25. A fiber optic cable according to claim 14 further comprising means extending lengthwise adjacent said plurality of buffer tubes for imparting tensile strength to said cable.

26. A fiber optic cable according to claim 14 wherein each of said buffer tubes has a predetermined inner cross-sectional area slightly larger than the combined cross-sectional areas of the respective optical fiber bundles positioned therein so that the respective optical fiber bundles are carried in a loose-buffered relationship within each of said buffer tubes.

27. A fiber optic cable according to claim 14 further comprising an outer protective jacket surrounding said plurality of buffer tubes.

28. A fiber optic cable according to claim 14 further comprising a central member positioned adjacent said plurality of buffer tubes.

29. A method for making an optical fiber cable comprising the steps of:
positioning a plurality of buffer tubes around a lengthwise extending central member with each of the buffer tubes including an identifying indicia associated therewith for identifying each individual buffer tube from the other buffer tubes; and
arranging a plurality of individual optical fibers into a plurality of optical fiber bundles within each of the buffer tubes and securing a binder around each of the optical fiber bundles for identifying each individual optical fiber bundle from the other bundles in a respective buffer tube for organizing and maintaining respective individual optical fibers together in bundled relation, each of the binders having respective identifying indicia associated therewith, and each optical fiber having a predetermined color for identifying each individual optical fiber from the other optical fibers within a respective optical fiber bundle; and
wherein three levels of identification coding are provided to enhance identification of individual optical fibers within the cable.

30. A method according to claim 29 wherein each of the binders comprises a textile yarn having a predetermined color and wherein the step of securing each binder around respective optical fibers comprises wrapping a textile yarn having a predetermined color around respective optical fibers in a spaced helical lay pattern.

31. A method according to claim 29 wherein the step of arranging the optical fibers into the optical fiber bundles within each buffer tube comprises arranging a relatively small number of optical fibers in each bundle to thereby facilitate connections to respective individual optical fiber bundles at a plurality of drop locations along the length of the cable.

32. A method according to claim 31 wherein the step of arranging the optical fibers into the optical fiber bundles within each buffer tube comprises arranging no more than about four optical fibers within each optical fiber bundle.

33. A method according to claim 32 wherein the step of arranging the optical fibers into the optical fiber bundles within each buffer tube comprises the step of arranging no more than about six optical fiber bundles within each buffer tube.

34. A method according to claim 29 wherein the step of arranging the optical fibers into the optical fiber bundles within each buffer tube comprises arranging the optical fiber bundles in a loose-buffered relationship within each of the buffer tubes.

35. A method according to claim 29 further comprising the step of positioning an outer protective jacket surrounding the plurality of buffer tubes.

* * * * *